(12) United States Patent
Fieldman (10) Patent No.: US 10,460,178 B1
(45) Date of Patent: Oct. 29, 2019

(54) AUTOMATED PRODUCTION OF CHAPTER FILE FOR VIDEO PLAYER

(71) Applicant: Study Social, Inc., Gainesville, FL (US)

(72) Inventor: Ethan Fieldman, Gainesville, FL (US)

(73) Assignee: STUDY SOCIAL INC., Gainesville, FL (US)

(*) Notice: Subject to any disclaimer, the term of this patent is extended or adjusted under 35 U.S.C. 154(b) by 0 days.

(21) Appl. No.: 16/394,919

(22) Filed: Apr. 25, 2019

(51) Int. Cl.
| H04N 9/80 | (2006.01) |
| G06K 9/00 | (2006.01) |
| G06K 9/34 | (2006.01) |
| H04N 5/92 | (2006.01) |

(52) U.S. Cl.
CPC ..... *G06K 9/00765* (2013.01); *G06K 9/00456* (2013.01); *G06K 9/00469* (2013.01); *G06K 9/00718* (2013.01); *G06K 9/344* (2013.01); G06K 2209/01 (2013.01)

(58) Field of Classification Search
CPC ........... G06K 9/00765; G06K 9/00718; G06K 9/00456; G06K 9/00469; G06K 9/344; G06K 2209/01

USPC ....... 386/241, 278, 243, 244, 239, 245, 248, 386/281, 285, 286
See application file for complete search history.

(56) References Cited

U.S. PATENT DOCUMENTS

| 2009/0111082 A1* | 4/2009 | Jorgensen | G06F 21/10 434/307 R |
| 2010/0141655 A1* | 6/2010 | Belinsky | G11B 27/10 345/440 |
| 2016/0364301 A1* | 12/2016 | Alatorre | G06F 11/1464 |

* cited by examiner

*Primary Examiner* — Robert Chevalier
(74) *Attorney, Agent, or Firm* — Beyer Law Group LLP

(57) ABSTRACT

A camera films a workbook and records a video file while an instructor teaches from the workbook and flips pages. The video file is uploaded to a computer in the cloud and is input into audio-visual software which splits the video file into still images at a frame rate. The images are input into OCR software which produces an alphanumeric machine-readable file or files corresponding to the images. This file or files is input into a program which identifies an index in each of the images. Or, the video file or an audio file is input into an audio analyzer or speech recognition software to identify spoken words or sounds that each indicate an index. Each index with its timestamp is written into a chapter file in order and saved into storage of a computer. Filtering removes duplicates. A video player combines the chapter file with the video file and the images to play the video file.

30 Claims, 9 Drawing Sheets

Chapter File

FIG. 1
Chapter File Production System

FIG. 2
Chapter File

FIG. 3

FIG. 4
Filtered Chapter File

Video with Annotations

FIG. 7

Video with Annotations

AUTOMATED PRODUCTION OF CHAPTER FILE FOR VIDEO PLAYER

CROSS-REFERENCE TO RELATED APPLICATIONS

This application is related to U.S. patent application Ser. No. 14/791,700 which is hereby incorporated by reference.

FIELD OF THE INVENTION

The present invention relates generally to video players and video files. More specifically, the present invention relates to producing a chapter file for use in a video player in conjunction with a video file.

BACKGROUND OF THE INVENTION

Currently, the general public watches a great deal of video files; videos are watched on desktop computers, laptop computers and on mobile telephones, etc. The videos may be entertaining, instructional, or other, and the viewer may typically use an interface at the bottom of the video to stop and start the video, fast forward, jump to the end, adjust the volume, view elapsed time, etc. There is also a progress bar that shows how much of the video has played and may include the elapsed time, a chapter number, a still image or other to help the viewer understand where in the video he or she is watching or help the viewer jump to another portion of the video.

A chapter file is typically a computer file used in conjunction with the video file that contains relevant information for display near the progress bar such as the chapter numbers of a video, page numbers, etc. The chapter file is typically used in conjunction with still images from the video (in the form of a sprite) in order to display information to the viewer when the viewer hovers a cursor (or other input) over a location on the progress bar. The chapter file, though, can be time consuming to create and typically involves a post-production process in which someone needs to manually create the file to include timestamps, chapter numbers, page numbers, etc. In certain scenarios it is desirable to film a video once and not have to spend time and money in a manual post-production process; unfortunately, being required to manually create a chapter file post production is not helpful. Manual post-production is very time consuming, especially at scale.

De Assuncao, U.S. Pat. No. 9,697,562, discloses using a camera to capture images of what a reader is reading, and then using OCR on those images to identify the book and the reader's location in the book. If the reader is near an "anchor point" then a request is sent for IT resources so the reader can perform a practical exercise. Apokatanidis, U.S. publication No. 2018/0197430, discloses use of OCR on printed material to produce text, and then using NLP to identify key concepts. Videos are uploaded, but only the audio is processed; there is no discussion of what happens to the video. Patel, U.S. Pat. No. 9,164,590, simply shows different video cameras that film a teacher, blackboard, notes, etc., and then synchronize everything.

Accordingly, techniques and systems are desired to assist with creating a chapter file for use in a video player that overcomes the above disadvantages.

SUMMARY OF THE INVENTION

To achieve the foregoing, and in accordance with the purpose of the present invention, a technique for producing a chapter file is disclosed that avoids the problems of the prior art.

Automated creation of a chapter file is advantageous for a tutor (or entity) who is creating an instructional video using a workbook. Automated creation of the chapter file from a video taken of the workbook allows a final video to be created without any post-production needed to manually create the chapter file.

A method of a first embodiment includes inputting a video file into audio-visual software and splitting the video file into a number of still images at a predefined frame rate. Each of the still images has a corresponding timestamp. Next, the still images are input into optical character recognition (OCR) software which produces a machine-readable file or files corresponding to the still images. Then, the machine-readable file or files are input into a computer program and an index of each of the still images is identified. Finally, each identified index along with its corresponding timestamp is written into a chapter file in chronological order; it may be saved into persistent storage of a computer.

A system in a second embodiment includes: a video file stored on a computer; audio-visual software arranged to split the video file into a number of still images at a predefined frame rate (each of the still images may have a corresponding timestamp); optical character recognition (OCR) software arranged to input the still images and to produce a machine-readable file or files corresponding to the still images; and a computer program arranged to input the machine-readable file or files, to identify an index of each of the still images, to write each identified index along with its corresponding timestamp into a chapter file in chronological order, and to save the chapter file into persistent storage.

A method of a third embodiment includes inputting a video file or an audio file into an audio analyzer in order to identify a number of discrete sounds that each indicate an index into an associated video file. The sounds are identified by comparison to an expected sound or spoken phrase. Also identified is a timestamp where each of the discrete sounds occurs that indicates the location of the index in the video file. Next, each identified index along with its corresponding timestamp is written into a chapter file in chronological order; it may be saved into persistent storage of a computer. In one specific embodiment, the video file input into the audio analyzer includes tones inaudible to the human ear that indicate each index. Each tone may be different, indicating a different index, such as a different page number.

A method of a fourth embodiment includes inputting a video file or an audio file into speech recognition software in order to transcribe spoken words to produce a transcript text file readable by a word processing program. Next, software identifies in the transcript file a number of phrases which each indicate an index into an associated video file. Also identified is a timestamp corresponding to each phrase that indicates the location of each index in the associated video file. Next, each identified index along with its corresponding timestamp is written into a chapter file in chronological order; it may be saved into persistent storage of a computer. In one specific embodiment, each phrase is the same (e.g., "next page"), in another, each phrase is different (e.g., "page three"), indicating a different index.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
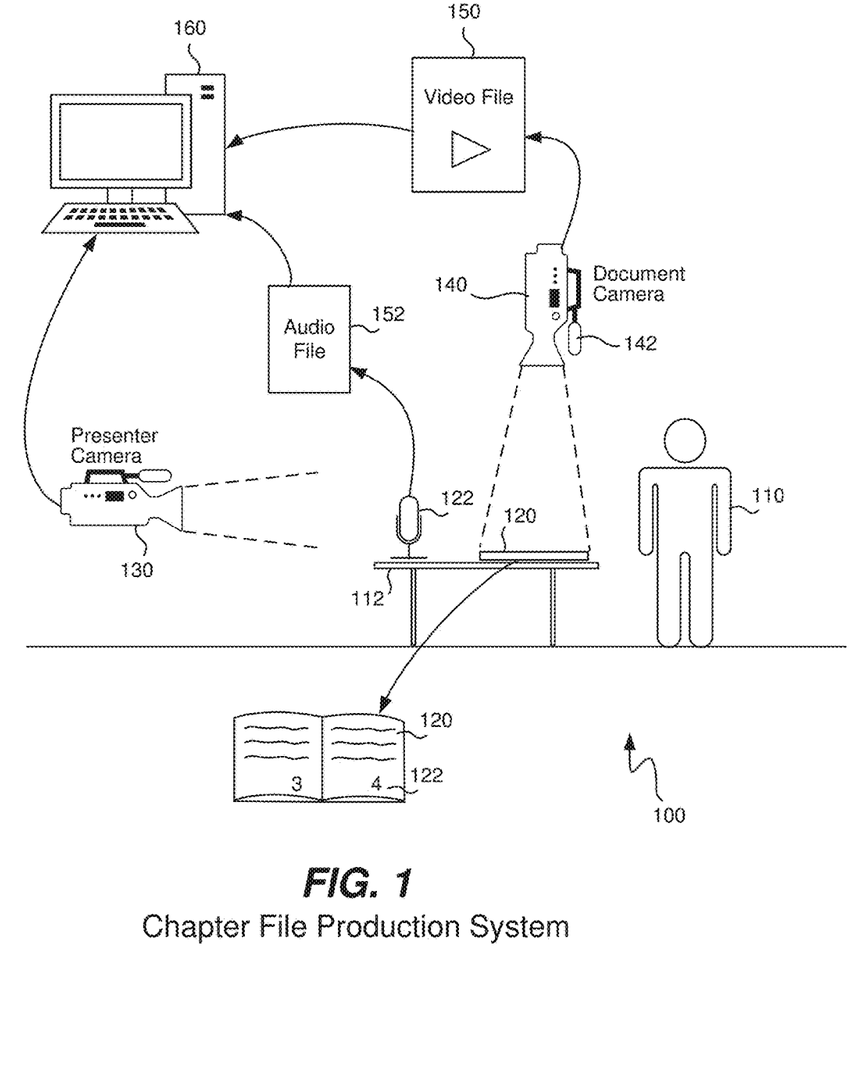
FIG. 1 is a block diagram of a chapter file production system according to one embodiment.

FIG. 1 is a block diagram of a chapter file production system 100 according to one embodiment. An instructor 110 in front of a table 112 is using a workbook 120 to explain a topic, teach a subject, tutor a student, or otherwise provide information that includes workbook 120. Workbook 120 may be any suitable workbook, book, sheets of paper, brochure, or other non-electronic materials that the instructor is using to provide the information. Workbook 1209 may also be electronic such as a tablet computer, mobile telephone, ancillary monitor, laptop, whiteboard, etc.

Shown expanded directly below, is one example of workbook 120 having page numbers 122 "3" and "4". These indices need not necessarily be numerals, but may be other alphanumeric characters identifying a particular page or sheet, may be QR codes, words, series of characters, titles or subtitles, images, specific colors, etc.

Although shown as having two pages, it is also possible that workbook 122 is a collection of sheets, plates, slides, etc., that are arranged in a stack such that only one page (and its index) is visible at a time. In a preferred embodiment, each index is unique within the workbook (such as a page number), meaning that once placed into a chapter file and displayed along with a video file, a viewer can navigate to a particular place in the workbook (as shown in the video) by selecting a particular index. These indexes are also typically arranged in ascending order in a workbook (in the case of numerals or letters), but in the case of a chapter name or title, they are not so ordered.

In order to create a final video of the instructor presenting the information, included within system 100 is a presenter camera 130 that films the instructor while presenting the information, and may have a field of view that can be limited to only a portion of the instructor only (i.e., not including the workbook, table or document camera). Camera 130 may be mounted on a tripod, be attached to a wall or similar surface, hang from the ceiling, may be attached to table 112, may be part of or attached to a computer (not shown) present on table 112, etc. Also included is a document camera 140 that films workbook 120 while the instructor is presenting, and may have a field of view that can be limited to the workbook only. As such, camera 140 captures workbook 120 as its pages or sheets are turned (forward or back) by the instructor or perhaps automatically without instructor intervention. Camera 140 may be attached to or hung from the ceiling, mounted on a boom or other arm, or may be part of a device that sits upon table 112.

Document camera 140 outputs a continuous video feed of workbook 120 thus creating a video file 150 which is saved onto a local computer 160. Accordingly, video file 150 is a video of the workbook which changes as the instructor turns its pages, meaning that not only will the content change in each page but also that the page numbers or indices will change as well throughout the video. Similarly, presenter camera 130 outputs a continuous video feed of the instructor 110 which is saved onto local computer 160. The two video feeds may be combined and streamed or saved into storage as is described in U.S. patent application Ser. No. 14/791,700 referenced above. In fact, system 100 may be implemented as shown in, and may incorporate elements from, U.S. patent application Ser. No. 14/791,700.

Figure 2:
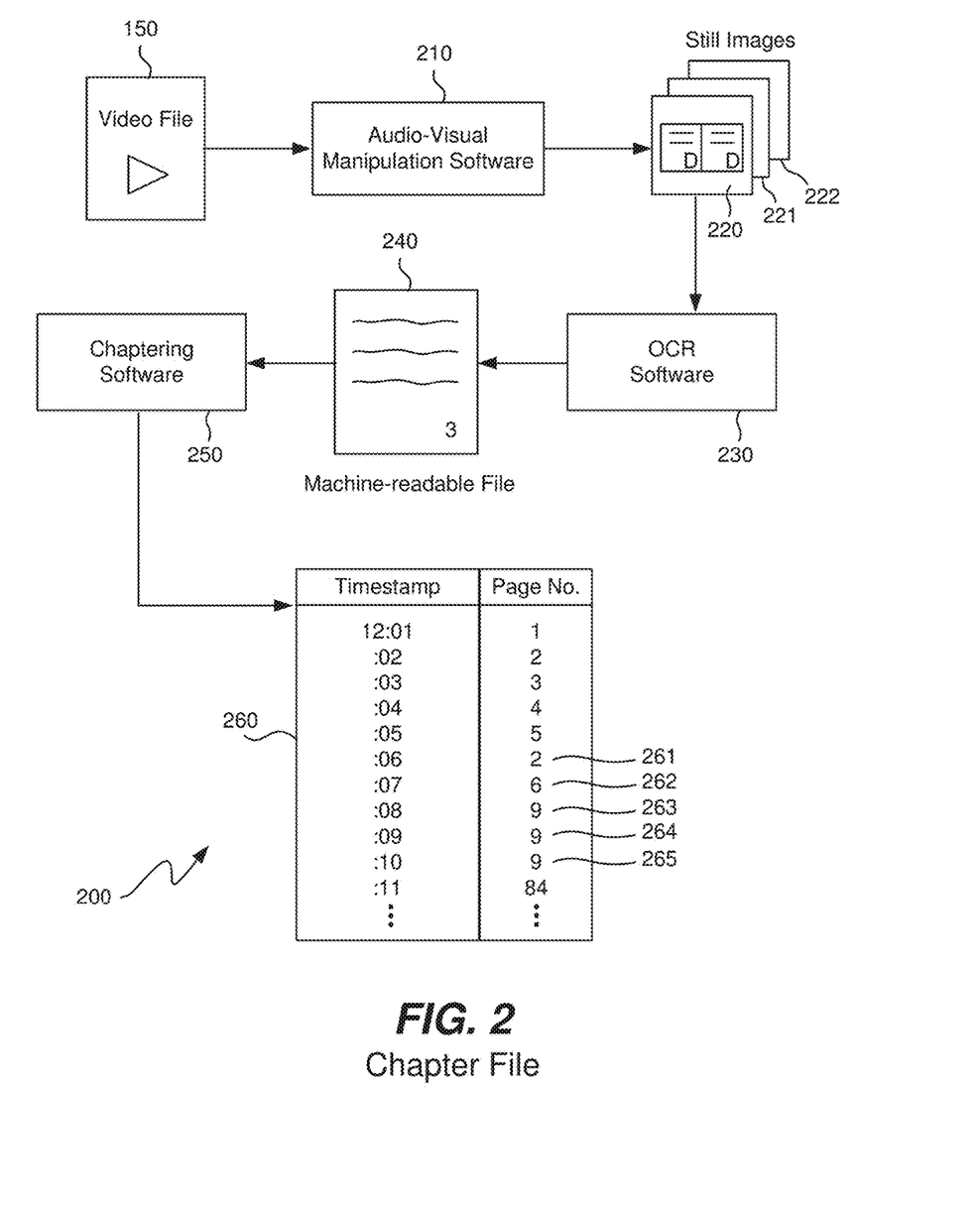
FIG. 2 is a block diagram showing components involved in the production of a chapter file.

FIG. 2 is a block diagram 200 showing components involved in the production of a chapter file. This production may occur on local computer 160 although preferably will occur on a server computer located at a cloud service to which the video file has been uploaded. Video file 150 is first input into audio-visual manipulation software 210 which produces a chronological series of still images 220-222 from the file. Shown in image 220 are two pages from workbook 120. Next, each still image is input into OCR software 230 which outputs for each still image a machine-readable file 240. This file 240 is then input into custom chaptering software 250 which produces chapter file 260 that corresponds to video file 150.

Flow Diagrams

Figure 3:
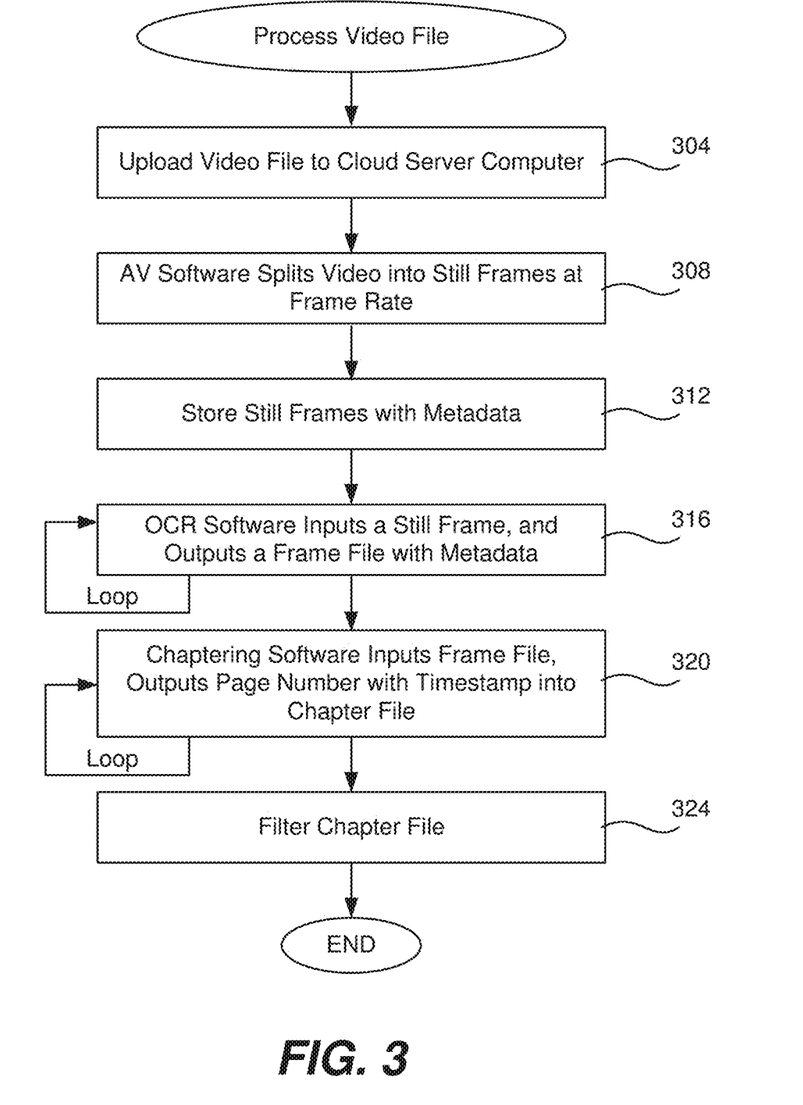
FIG. 3 is a flow diagram describing one embodiment by which the video file is processed in order to produce its corresponding chapter file.

FIG. 3 is a flow diagram describing one embodiment by which the video file is processed in order to produce its corresponding chapter file. In a first step 304 video file 150 is uploaded over an Internet connection (or similar) to a server computer located at a cloud service where the below processing will occur. It is also possible to perform the below processing on computer 160. In step 308 any suitable audio-visual manipulation software splits the video file into still frames at a predefined frame rate. The audio-visual software "ffMPEG" may be used, although other software such as Adobe Premier or Final Cut Pro may also be used. The predefined frame rate is preferably one second, although faster frame rates such is ½ second or slower frame rates may also be used. Thus, a video sixty seconds long is split into sixty still frames when a frame rate of one second is used; a frame rate of ½ second results in 120 still frames. As shown in still image 220, a workbook may be open to two pages at once meaning that each still image includes two pages of the workbook. In another embodiment, the workbook is a series of single pages (e.g., a sheaf of single, one-sided pages stapled together, or a workbook in which only the right page has text, the left page being blank), in which case still image 220 would only show a single page having a single page number or similar index. Next, each of these still frames is stored on the server computer in step 312 along with metadata for each frame such as a timestamp of when the frame occurs in the video, a unique video identifier indicating when the video was taken, subject matter, name of instructor, etc.

In step 316 OCR software on the server computer inputs a still frame, one at a time, processes this frame to recognize the alphanumeric characters in the frame, and outputs a frame file with metadata for each still frame. Suitable OCR software that may be used is known in the art. As known in the art, OCR software inputs images and outputs alphanumeric characters (e.g., text) that it recognizes in the image. The output frame file will thus be a text file or similar machine-readable file from which the indices 122 can be recognized. In other words, the output frame file from the OCR software is a file that may be opened, understood and searched by variety of word processing program such as Microsoft Word, Apple Pages, TextEdit, or similar software. In an alternative embodiment, the still frames output from the audio-visual software need not necessarily be stored in step 312, but may be input directly into the OCR software. Each output frame file 240 will also be stored on the server computer along with its corresponding metadata such as a timestamp for each frame file, and the video identifier. Moreover, the output from the OCR software may be a single file (including all of the still images) rather than a single file per image.

In the example of FIG. 2, the OCR software has been configured to recognize that still image 220 consists of two pages of a workbook and to output those two pages separately but consecutively. Thus, the OCR software outputs machine-readable file 240 having page number "3" and will then output a second machine-readable file which has page number "4". In another embodiment, the OCR software simply outputs a single machine-readable file which consists of both pages shown in still image 220 and this file having both pages will be input to the chaptering software 250.

If a QR code is found within the still image and is known to be the index, or is found in a location where the index should appear (such at the bottom center of the page), the OCR software will translate this QR code into its corresponding, text, word, title etc. To perform this translation, the OCR software reads the QR code and uses a machine learning algorithm to identify text, numerals, words, etc. based on previously used patterns. As indicated, step 316 is a loop in which the OCR software inputs and processes each of the still frames from the video.

Next, in step 320 custom chaptering software inputs each frame file, one at a time (or the single file that holds the translation of all images), searches for the index on the page (such as the page number), and outputs this index along with the timestamp from the corresponding frame file into a chapter file. In the embodiment in which each frame file includes a single page from workbook the software need only find a single page number or index. In the embodiment in which each frame file includes two pages from the workbook, the software will typically only search for and recognize the rightmost page number (i.e., only the even-numbered pages). In order to save the timestamp into the output frame file (which is output by the OCR software), the timestamp is saved in memory and then typically stored in a database that the chaptering server can access with an index identifier of the video file being chaptered.

A variety of techniques may be used by the chaptering software to find the index within each frame file. If the index is a chapter number, which is typically at the top of the page in the center, the software searches for the chapter number at the top of the page (e.g., in the center). If the index is a page number, as a page number is typically the last alphanumeric character on a page, the software searches for the page number at the bottom of the page (e.g., in the center or on the right-hand side). Or, if the page number of the workbook has been typed or written using a unique typeface, font, size or emphasis (e.g., bold, underline, italics, etc.), the software is programmed to search for this unique characteristic of an alphanumeric character or characters on the page. As the entity that is processing the video file is the same entity that is using production system 100 (or controlled by the same entity), this entity is aware of how and where the page numbers are placed upon a page of the workbook and can program this chaptering software accordingly. Furthermore, this entity may also be responsible for printing these workbooks and is then able to print page numbers using any of the unique characteristics described above and can then program the chaptering software to search for page numbers using these characteristics. Other ways to search for and find the page numbers on a page include using a specific pixel range on the book for certain elements, or using a machine learning algorithm to search for a specific color or shape surrounding the page number.

Once a page number has been identified in a particular frame file, this software outputs that page number along with the timestamp from the frame file into a chapter file, such as chapter file 260. As indicated, step 320 is a loop in which the software inputs and processes all frame files that have been saved in step 316. In an alternative embodiment, it is not strictly necessary that the OCR software save each frame file on the server computer but may directly input a frame file to the chaptering software 250. Once the loop in step 320 is completed the chapter file is also stored into persistent storage on the server computer.

Chapter file 260 is in example chapter file such as may be produced from a workbook having single pages. Each row of the chapter file corresponds to a frame file from step 320 that has been processed and output. In this example the frame rate is every one second, and as shown, the instructor turns a page every one second for the first five seconds. Row 261, though, shows that after turning to page 5, the instructor turned back to page 2 briefly before continuing and turning back to page 6 as shown in row 262. Row 263 shows that for a number of seconds the instructor left the workbook at page 9, and then skipped ahead and turned the workbook to page 84. Thus, chapter file 260 shows that no matter how the instructor turns the pages (either forward or backward), or for how long the instructor leaves the workbook a particular page, the chapter file accurately shows which page is showing at a particular time.

As mentioned above, the chapter file is useful in combination with the video file in a video player for displaying in the progress bar where certain pages or chapters may be found in the video. While the chapter file may be used as is from step 320, in an optional step 324 the chapter file may be filtered to remove duplicate page numbers. In this example, chapter file 260 is filtered to remove rows 264 and 265 because these include duplicate page numbers. After filtering, the resulting chapter file will not have any rows that have duplicate page numbers, thus, the chapter file will not indicate which page is being shown at a given second, but rather at what time a change occurs from one page to another.

Figure 4:
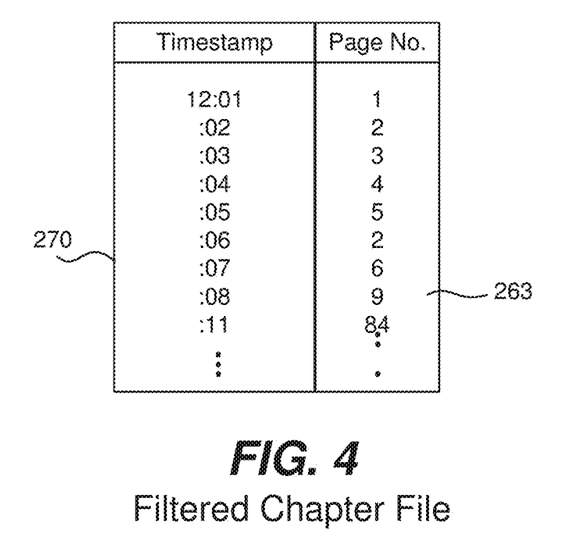
FIG. 4 is an example of a chapter file that has been filtered.

FIG. 4 is an example of a chapter file 270 that has been filtered. As shown, rows 264 and 265 have been removed, leaving only row 263 representing page number 9. In this fashion, the filtered chapter file represents the time at which a transition from one page number to the next occurs, and does not necessarily list a page number for every time interval, such as every second. In situations where it is unlikely that pages are shown in the video for a number of seconds, or when it is known that pages are not shown for a lengthy time, use of filtering may not be needed.

Figure 5:
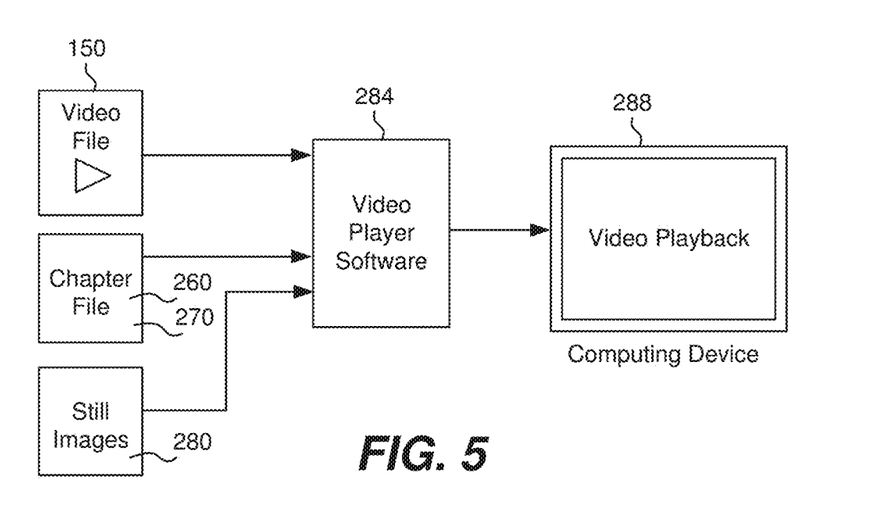
FIG. 5 is a block diagram showing how a video file may be displayed to user in one embodiment of the invention.

FIG. 5 is a block diagram showing how a video file may be displayed to user in one embodiment of the invention. Once the chapter file has been created as described above, it is useful to combine the chapter file with the video file during playback in order to provide the user with additional information such as still images, timestamps, page and chapter numbers, etc. Shown is video player software 284 arranged to play back a video on a computing device 288 such as a user laptop or desktop computer, mobile telephone or tablet computer. Video player 284 is typically part of a browser on a computer or mobile telephone. Input to the video player are the original video file 150, chapter file 260 (or a filtered chapter file 270), and the still images 280 which are the images previously stored in step 312. Typically, still images 280 are stored in the form of a sprite, which is a single image containing all of the still images; the sprite is useful in that it can be downloaded once to a user computer instead of separately downloading individually each of the still images.

Figure 6:
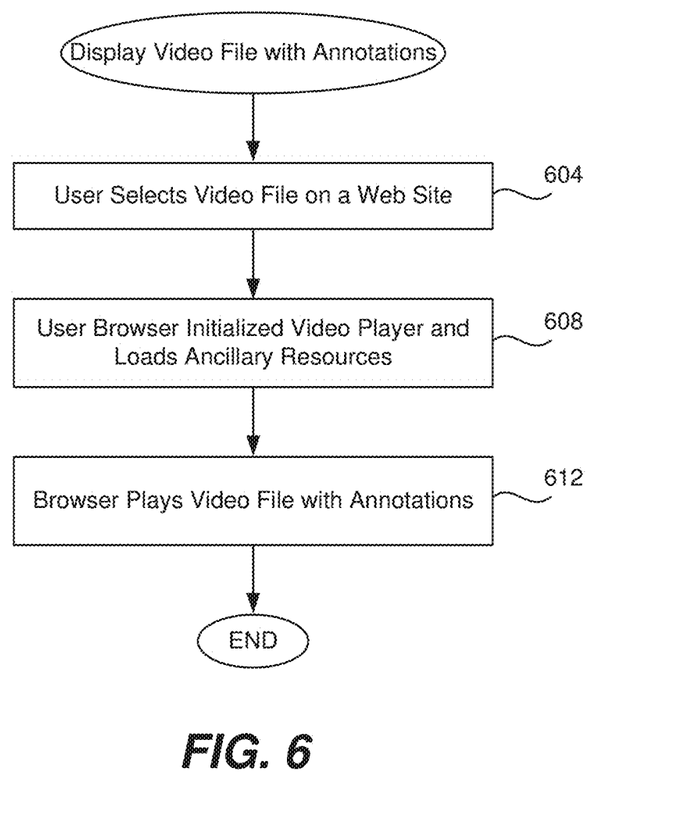
FIG. 6 is a flow diagram describing one embodiment by which a video file with annotations is displayed on a user computing device.

FIG. 6 is a flow diagram describing one embodiment by which a video file with annotations is displayed on a user computing device. Video file 150 is present on a server computer in the cloud along with chapter file 260 and still images 280 and are available via a Web site. In this embodiment the user desires to watch the video file available on the Web site, navigates to that Web site and in step 604 selects the video file for playback. In step 608 the user browser initializes the video player and downloads the ancillary resources such as the chapter file and the still images (typically in the form of a single sprite) from the server computer. Next, in step 612 the browser plays the video file with the available annotations from the chapter file and the still images.

Figure 7:
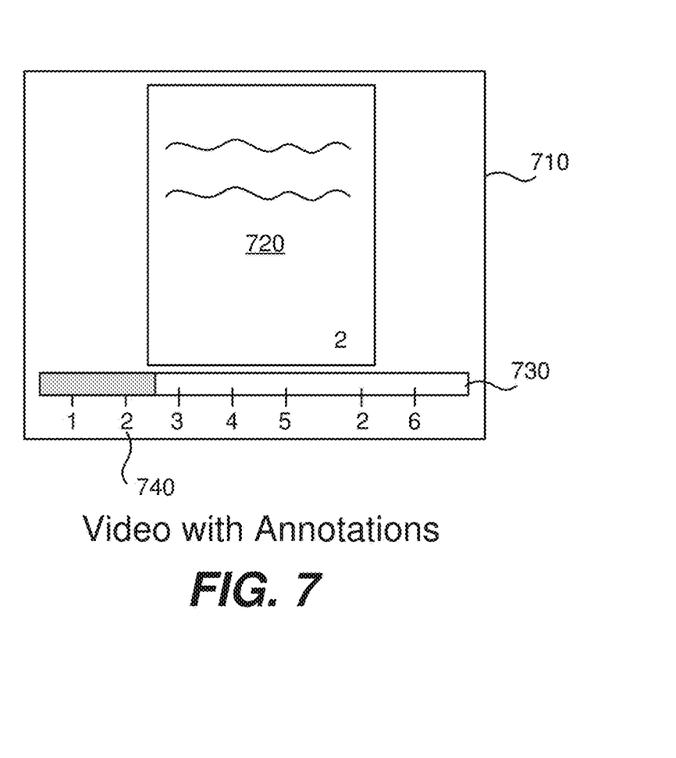
FIG. 7 is an illustration of how use of the chapter file results in particular annotations being shown while the user is watching a video (or when the video is paused or has not yet started).

FIG. 7 is an illustration of how use of the chapter file results in particular annotations being shown while the user is watching a video (or when the video is paused or has not yet started). Shown is a video being displayed in window 710 which includes images of the workbook 720 as its pages are returned; in this example, the workbook is on page 2. Also shown is a progress bar (or seek bar) 730 showing the progress of the video to which has been annotated page numbers 740. In some video players the progress bar overlaps or is displayed over the video being displayed, although in this example for simplicity the progress bar is shown below the workbook. Page numbers 740 are taken from the chapter file 260 (or 270) and are displayed within or near the progress bar in response to the user hovering a cursor over video window 710 or may be displayed permanently (depending upon the video player) in order that the viewer may easily find particular pages within the video.

Figure 8:
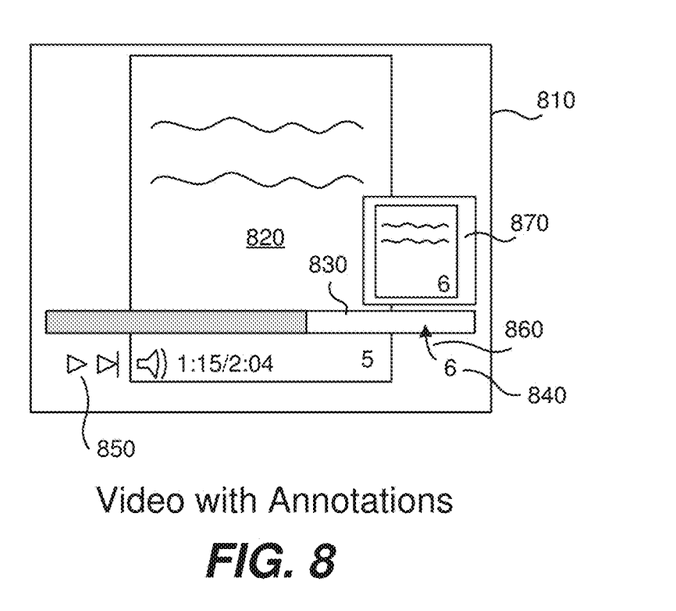
FIG. 8 is an illustration of how use of the chapter file results in particular annotations being shown while the user is watching a video (or when the video is paused or has not yet started).

FIG. 8 is an illustration of how use of the chapter file results in particular annotations being shown while the user is watching a video (or when the video is paused or has not yet started). Shown is a video being displayed in window 810 which includes images of the workbook 820 as its pages are returned; in this example, the workbook is on page 5. Also shown is a progress bar (or seek bar) 830 showing the progress of the video. In this example the progress bar is shown overlapping and partially obscuring the video of the workbook itself. Shown are user interface controls 850 such as a play button, fast forward, volume, elapsed time, etc. In response to the viewer hovering a cursor 860 over a particular location on the progress bar, the video player displays not only the page number 840 (in this example, "6") corresponding to the location on the progress bar, but also a still image 870 (taken from a sprite, typically) showing an image from the video at that point in time. Page number 840 is taken from the chapter file 260 (or 270) and may be displayed within or near the progress bar in response to the user hovering a cursor over a particular location on the progress bar. Typically, page number 840 and still image 870 disappear when the cursor is moved off of the progress bar, and, the progress bar and user interface also disappear when the cursor is moved outside of window 810. In other embodiments, the progress bar and user interface may be displayed permanently (depending upon the video player) although page number 840 and still image 870 typically will only appear when the cursor is placed or hovers over a location on the progress bar.

As mentioned above, the index present in a workbook is not limited to a page number, but may be a chapter number, a letter or word, a title, subtitle or chapter name. Accordingly, the indices 740 and 840 need not be numerals but may be any of these other indices.

Voice Index Embodiment

The above description presents an embodiment in which document camera 140 films a workbook 120 in order to capture visual indices 122. In an alternative voice index embodiment, indices are generated via any type of sound (e.g., voice, tone, etc.) and are captured via a microphone before being processed in order to create the chapter file. A portion of the system 200 of FIG. 2 may still be used in this voice index embodiment in order to capture still images. In that situation, still images 220-222 are produced, but elements 230, 240, 250 and 260 are not needed. Or, if still images will not be displayed (such as in FIG. 7), then production of the still images by software 210 is not needed.

Accordingly, as shown in FIG. 1, document camera 140 also includes a microphone 142 suitable for capturing any sound generated in its vicinity. In one example, instructor 110 speaks the particular index as he or she turns a page in the workbook. Thus, when on page one the instructor says "page one." When the user turns the page and is on page three (as shown in FIG. 1) the instructor says "page three." Preferably, the instructor states the page number when he or she first turns to that page. Where only one page is shown at a time the instructor simply states that page number, when two pages are shown at a time the convention may be that the instructor simply states the page number shown on the left. Of course, any other type of index (or chapter event) may be spoken by the instructor as he or she reaches that point in the workbook such as "chapter one," "chapter two," etc., including any of the indices described above. In one embodiment, workbook 120 is an electronic device (such as a tablet computer) that is configured to automatically speak the particular index when the instructor first turns to that page or chapter. For instance, when the instructor selects page six on the tablet, for example, the tablet speaks "page 6" using voice synthesis which is then picked up by microphone 142. Of course, instructor 110 may also be speaking in order to present instruction regarding workbook 120 and the indices he speaks will be interspersed within this instruction. Thus, all spoken indices (whether by human or machine) are picked up by microphone 142 and are recorded within video file 150 as is known in the art.

In a separate embodiment, in order to not distract a viewer of the video file, an unobtrusive sound may be generated that represents a particular index within the video file. This sound may be generated by instructor 110, such as by tapping, clicking, whistling or otherwise generating a sound (using his or her mouth, hands, etc.) that will be picked up by microphone 142. For example, the convention may be that the instructor clicks, taps the table, rings a bell, etc., whenever he or she moves to a new page in the workbook. It is also possible that another person off camera generates this sound whenever he or she notes that the instructor has turned to a new page. In another example, the instructor uses a suitable device (whistle, pressing upon a mechanical device, pressing a button of an electrical device) to generate a high-pitched tone that is beyond hearing range of humans when he or she turns to new page. For example, there are a variety of applications available on a smartphone that generate tones of varying pitches. The instructor may be holding such a smartphone, accessing it while it sits upon table 112, or such a smartphone may be used by a person off camera. In other words, the high-pitched tone is emitted at each page that cannot be heard by a human, thus not distracting a viewer of the video file. Low-frequency tones may also be used that are out of the hearing range of humans. In one embodiment, workbook 120 is an electronic device that automatically emits such a sound (audible by humans or not) when instructor turns to new page, chapter, etc.

In an embodiment in which the sound (tap, click, whistle, tone, etc.) is consistently the same each time the instructor reaches the next index in the workbook (such as next page, next chapter, etc.), recognition of this sound will indicate the next index but will not necessarily indicate precisely which index it is (i.e., which page the instructor is on). One convention is that the first such sound indicates page one, the second sound indicates page two, and so forth, although this convention may not always be entirely accurate if the instructor skips pages. In certain embodiments, though, in which the instructor proceeds consistently page-by-page through a workbook, this convention works fine.

In an alternative embodiment to better detect a particular index, a different frequency (or frequency range) of a tone is used to represent each index. For example, using the embodiment in which the tone is above the frequency at which humans can typically hear (i.e., above 20 kHz), page one is represented by a tone of 20,100 Hz, page two by 20,200 Hz, page three by 20,300 Hz, etc. Each such different frequency may be an approximate frequency or a range, such as page one is represented by a tone in the range of 20,050 Hz-20,150 Hz. Generation of such a different frequency may be accomplished by: using an application on a smartphone in which the instructor taps a particular page number on the screen in order to generate the specific tone for that page number; an application executing upon an electronic device which is workbook 120 that generates the unique frequency when the corresponding page is displayed; or an additional person off camera who generates the tone as each page is displayed. Or, each tone may be of a different duration, different amplitude, include a different noise level, or other differing signal characteristic, etc., so that each tone may be distinguished on the basis of having a different signal characteristic. Thus, all such sound indices (whether by human or machine, and whether audible or inaudible to the human ear) are picked up by microphone 142 and are recorded within video file 150 as is known in the art.

In addition to, or instead of, using microphone 142 which is integrated with camera 140, a separate microphone 122 may be used to pick up the spoken indices (such as the instructor's speech, other generated sounds or tones, etc.). When microphone 122 is used the recorded audio will be saved into an audio file 152 rather than into video file 150. (Although, it is also possible to use a discrete microphone that plugs into document camera 140.) Microphone 122 may be a discrete microphone present upon table 112 or located nearby, that feeds its output directly into computer 160 (or other local computing device) in order to create audio file 152. Alternatively, microphone 122 may be integrated within workbook 120 if workbook 120 is an electronic device. In this situation, audio file 152 will be recorded within that electronic device and can be transferred to computer 160 using with a wired or wireless connection. Alternatively, microphone 122 may be a microphone of a mobile telephone (or other portable electronic device) that is present in the vicinity and able to pick up the spoken words or generated sounds. For instance, instructor 110 may be holding such a mobile telephone or it may be located upon table 112 out of the view of camera 130 such that the instructor may tap its screen surreptitiously as needed. In such an embodiment, audio file 152 will be stored upon such a mobile telephone and this audio file may be transferred to computer 160 typically using a wireless connection by uploading the audio file to a cloud service.

Now that the system of FIG. 1 has been described with respect to the voice index embodiment, a method for processing these recorded voice indices will now be described.

Figure 9:
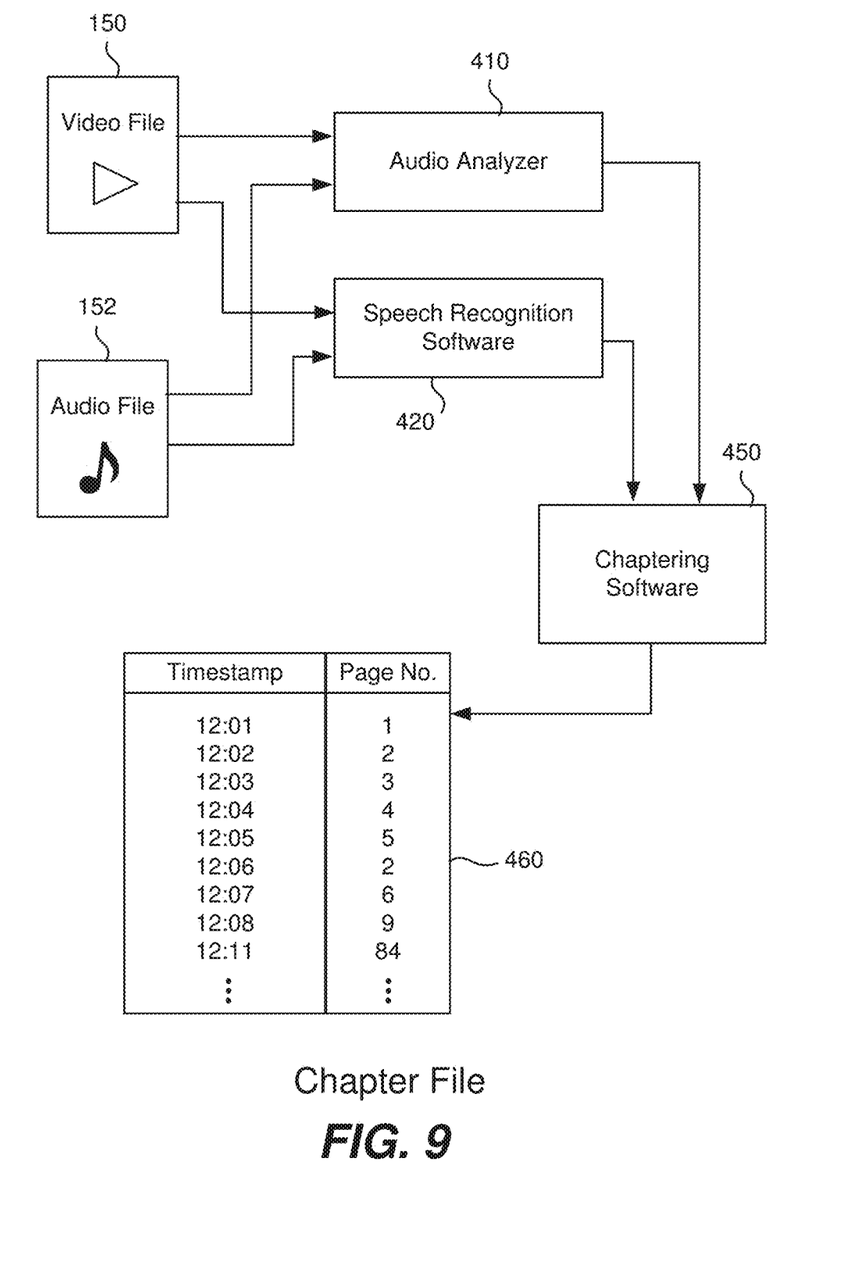
FIG. 9 is a subsystem showing how recorded voice indices are processed in order to create a chapter file.

FIG. 9 is a subsystem showing how recorded voice indices are processed in order to create a chapter file, and will be described in more detail with respect to FIG. 10. Shown is a video file 150 or an audio file 152 (depending upon whether microphone 142 or microphone 122 is used). Depending upon which embodiment is used, the output of each of these files may be sent to an audio analyzer 410 or to speech recognition software 420. A different version of chaptering software 450 inputs the outputs from analyzer 410 or from software 420 and creates chapter file 460.

Figure 10:
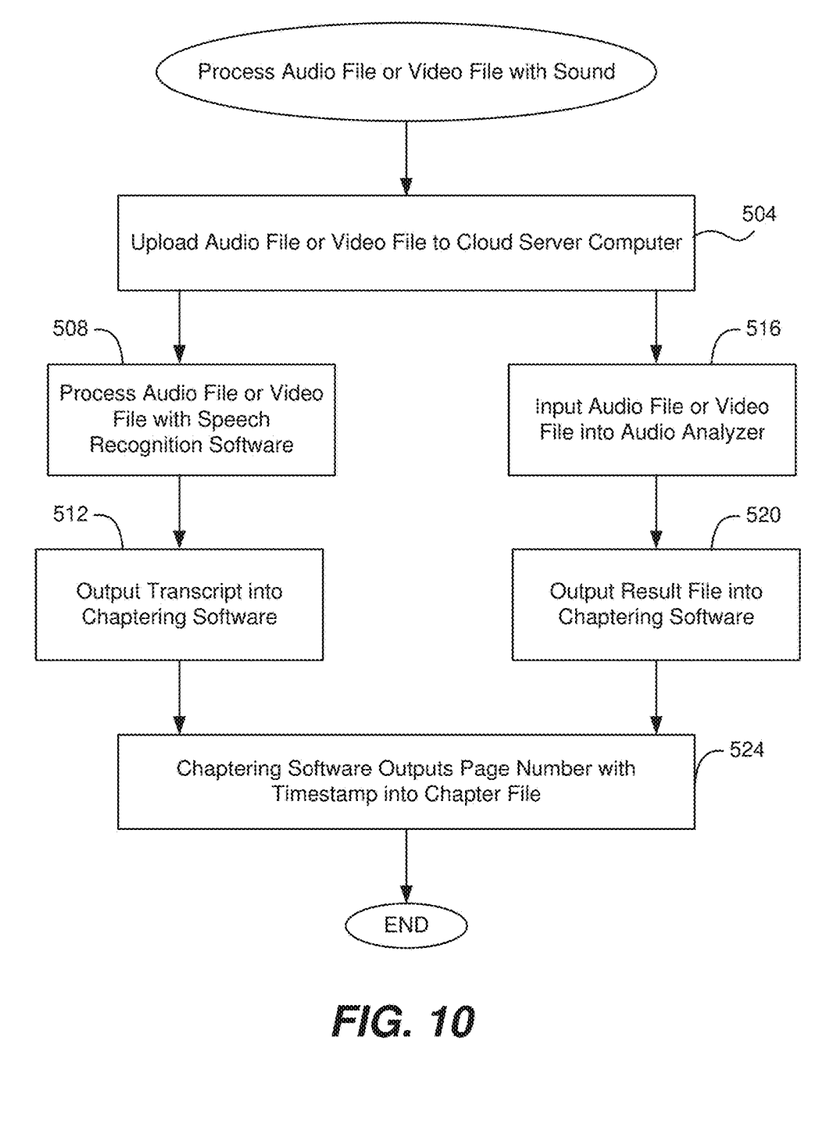
FIG. 10 is a flow diagram describing one embodiment by which an audio file or a video file with sound is processed in order to create a chapter file.

FIG. 10 is a flow diagram describing one embodiment by which an audio file or a video file with sound is processed in order to create a chapter file. In the embodiment in which still images are used, video file 150 (if that is where the microphone is) will be input into audio-visual manipulation software 210 as well as into audio analyzer 410 (or into speech recognition software 420). If no still images will be used, then video file 150 (if that is where the microphone is) need only be input into 410. If the sounds are recorded into audio file 152, then video file 150 is only input into video player software 284 and need not be processed beforehand.

The above has described system 100 in which a microphone is used to record spoken words or generated sounds indicating indices within workbook 120. This embodiment a system 100 relies upon certain a priori information regarding the type of sound that will be generated and the convention used to represent an index. For example, if it is known ahead of time that instructor 110 will be speaking each page number, that a priori information will be used in the below flow. On the other hand, if it is known ahead of time that the instructor will tap a particular page number on his mobile telephone in order to generate a different inaudible tone for each page number, that a priori information will instead be used in the below flow.

In a first step 504 video file 150 or audio file 152 is uploaded over an Internet connection (or similar) to a server computer located at a cloud service where the below processing will occur. It is also possible to perform the below processing on computer 160. If microphone 142 will be used to capture sounds then the video file is uploaded, on the other hand, if a separate microphone 122 is used then the audio file 152 that it creates will be uploaded. Next, a determination is made based upon the a priori information as to whether the file should be processed using speech recognition software or whether the file should be input into an audio analyzer. If it is known that the instructor will be speaking the indices as he turns pages or that voice synthesis will be used (e.g., "page one," etc.), then it is most likely speech recognition software 420 will be used. On the other hand, if it is known that a particular sound or tone will be generated (by the instructor or by a mechanical or electronic device) then audio analyzer 410 will be used.

If speech recognition software, then in step 508 the audio file or video file is input into the speech recognition software on a suitable computer in order to produce an automatic transcript of the sounds and speech recorded. Speech recognition software such as "Dragon NaturallySpeaking" available from Nuance Corporation or a variety of open-source speech recognition software may be used. As known in the art, such speech recognition software will output a transcription of the speech found in either file which will necessarily include the spoken indices such as "page one," "page two," etc. Next, in step 512, this transcript is input into custom chaptering software 450 which searches for these spoken indices in the transcript and determines a timestamp where each index occurred within the file. Typically, such custom chaptering software will search for such indices in the transcript based upon its a priori knowledge of which indices will be spoken and using a text search.

Next, in step 524 chaptering software 450 will output these found indices (such as page numbers) along with a timestamp for each index where it occurs within the transcript in the form of a chapter file 460. Note that chapter file 460 need not be filtered (as was chapter file 260) as the spoken index will typically only occur once within the transcript. Thus, chapter file 460 shows that, for example, the instructor spoke "page two" at a time of 12:02, flipped back to page two at 12:06 and again spoke "page two," and at 12:11 flipped forward to page 84 and spoke "page 84," among the other page numbers that the instructor spoke as he reached them.

Returning now to step 516, if it is known that the audio file or video file will include sounds or tones (rather than spoken words) then the audio file or the video file (depending upon the embodiment) is input into an audio analyzer. Depending upon the audio analyzer used, and the amount of effort desired to put into configuring the audio analyzer for recognition of speech, it is also possible to use an audio analyzer to recognize certain spoken words in order to identify an index. For example, the audio analyzer may be configured to recognize the spoken words "page one," etc. More typically though, the audio analyzer will be used to recognize sounds or tones. As is known in the art, an audio analyzer is a software module or product used to perform sound analysis of audio, such as audio spectrum analysis, e.g., the product "WavePad FFT Sound Analyzer." A test and measurement hardware device used to quantify audio signals may also be used in conjunction with computer 160 instead. The audio analyzer analyzes the incoming audio signal in order to detect the expected indices (such as the frequency or other characteristics of a particular sound, the frequency or range of the expected tone or tones), and then in step 520 outputs an identification of the detected sound or tone and a timestamp of where it occurs within the audio file or video file.

Next, in step 524 the custom chaptering software 450 outputs a chapter file such as that shown at 460 using information received from the audio analyzer in step 520. As mentioned above, there is no need to filter such a chapter file since the detected sound or tones typically only occur at discrete intervals, rather than appearing continuously as in the video embodiment shown in FIG. 2.

Additional Embodiments

The invention also includes these additional embodiments.

31. A system for creating a chapter file, said system comprising:
a video file stored on a computer;
audio analyzer software of said computer arranged to identify within said video file, by comparison to an expected sound, a plurality of discrete sounds, each of said discrete sounds indicating an index into an associated video file, and being further arranged to identify a timestamp corresponding to each of said discrete sounds that indicates a location of said each index in said associated video file;
a computer program arranged to identify an index for each of said discrete sounds, to write each identified index along with its corresponding timestamp into a chapter file in chronological order, and to save said chapter file into persistent storage of said computer.

32. A system for creating a chapter file, said system comprising:
a video file stored on a computer that includes spoken words;
speech recognition software of said computer arranged to transcribe said spoken words in order to produce a transcript file; and
chaptering software of said computer arranged to identify within said transcript file, by comparison to an expected phrase, a plurality of phrases, each of said phrases indicating an index into an associated video file, to identify a timestamp corresponding to each of said phrases that indicates a location of said each index in said video file, to write each identified index along with its corresponding timestamp into a chapter file in chronological order, and to save said chapter file into persistent storage of said computer.

33. A system for creating a chapter file, said system comprising:
a workbook displayed on a table in front of an instructor having pages;
a document camera located above said workbook and arranged to film said camera to produce a video file;
a microphone associated with said video camera and arranged to capture audio information for said video file;
an electronic device arranged to emit a tone each time a chaptering event occurs in said workbook, said microphone capturing said tones, whereby said video file includes one of said tones each time said chaptering event occurs in said workbook.

34. A system as recited in claim 33 wherein said electronic device includes said workbook, said electronic device being further arranged to detect each time said chaptering event occurs in said workbook.

35. A system as recited in claim 33 wherein said chaptering event is a next page being displayed in said workbook or is a next chapter being displayed in said workbook.

36. A system as recited in claim 33 wherein said electronic device is a tablet computer or a mobile telephone being arranged to emit said tone when actuated by said instructor.

Computer System Embodiment

Figure 11A:
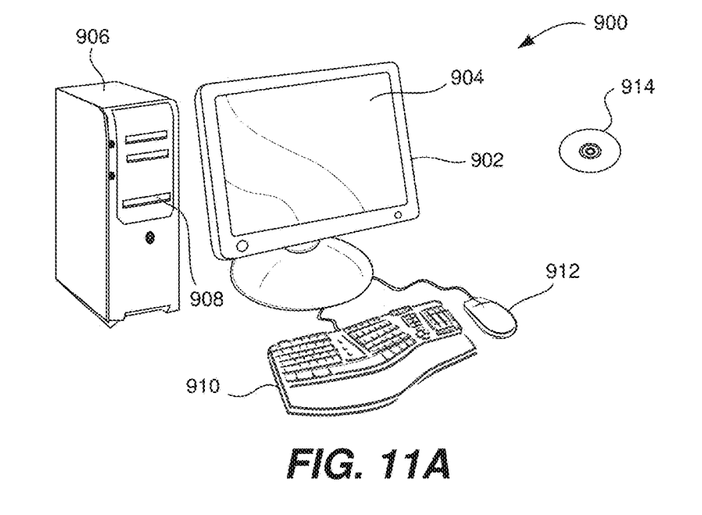
FIGS. 11A and 11B illustrate a computer system suitable for implementing embodiments of the present invention.
Figure 11B:
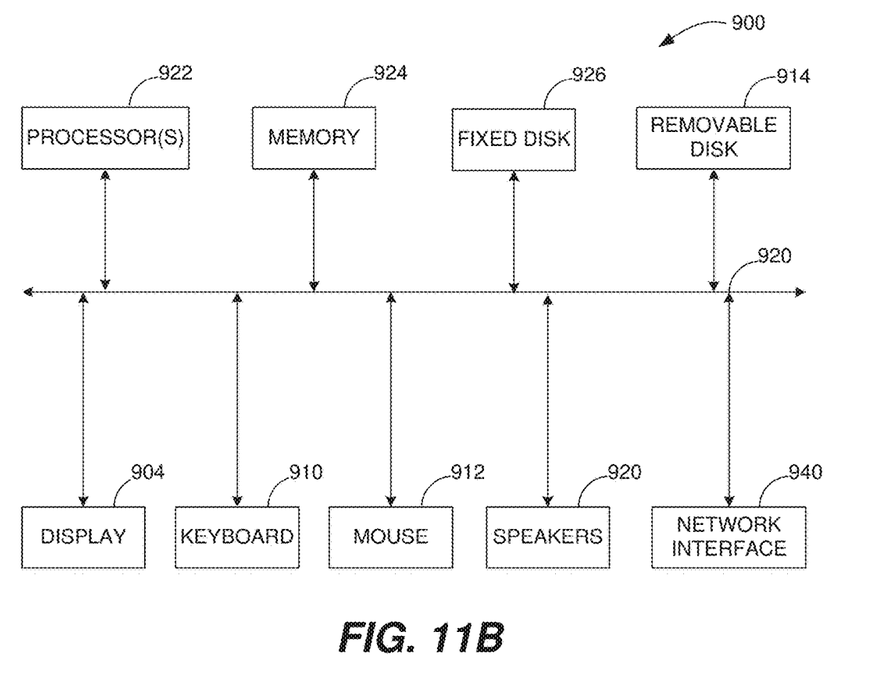

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 1B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of creating a chapter file, said method comprising:
   inputting a video file into audio-visual software and splitting said video file into a plurality of still images at a predefined frame rate, each of said still images having a corresponding timestamp;
   inputting said still images into optical character recognition (OCR) software and producing a machine-readable file or files corresponding to said still images;
   inputting said machine-readable file or files into a computer program and identifying an index of said each of said still images; and
   writing each identified index along with its corresponding timestamp into a chapter file in chronological order and saving said chapter file into persistent storage of a computer.

2. A method as recited in claim 1 further comprising:
   combining said chapter file with said video file in a video player; and
   playing said video file on a user computer and displaying contents of said video file along with at least one of said indexes.

3. A method as recited in claim 1 further comprising:
   combining said chapter file with said video file and said still images in a video player; and
   playing said video file on a user computer and displaying contents of said video file along with at least one of said indexes and at least one of said still images.

4. A method as recited in claim 1 wherein said video file is substantially a video of a workbook having pages, each page having one of said indexes, and wherein said pages change periodically.

5. A method as recited in claim 1 wherein said index is a number, a letter, a group of letters, a word, a chapter name or number or a title.

6. A method as recited in claim 1 further comprising:
   filtering said chapter file to remove duplicate indexes and their corresponding timestamps; and
   saving said filtered chapter file into persistent storage on said computer.

7. A method as recited in claim 1 further comprising:
   upon request from a video player of a browser on a user computer, downloading said chapter file to said browser along with said video file.

8. A method as recited in claim 1 further comprising:
   recording said video file of a workbook using a fixed document camera; and
   uploading said video file to said computer.

9. A system for creating a chapter file, said system comprising:
   a video file stored on a computer;
   audio-visual software of said computer arranged to split said video file into a plurality of still images at a predefined frame rate, each of said still images having a corresponding timestamp;

optical character recognition (OCR) software of said computer arranged to input said still images and to produce a machine-readable file or files corresponding to said still images; and a computer program arranged to input said machine-readable file or files, to identify an index of said each of said still images, to write each identified index along with its corresponding timestamp into a chapter file in chronological order, and to save said chapter file into persistent storage of said computer.

10. A system as recited in claim 9 further comprising:
a video player arranged to combine said chapter file with said video file, to play said video file on a user computer, and to display contents of said video file along with at least one of said indexes.

11. A system as recited in claim 9 further comprising:
a video player arranged to combine said chapter file with said video file and said still images, to play said video file on a user computer, and to display contents of said video file along with at least one of said indexes and at least one of said still images.

12. A system as recited in claim 9 wherein said video file is substantially a video of a workbook having pages, each page having one of said indexes, and wherein said pages change periodically.

13. A system as recited in claim 9 wherein said index is a number, a letter, a group of letters, a word, a chapter name or number or a title.

14. A system as recited in claim 9 wherein said computer program is further arranged to filter said chapter file to remove duplicate indexes and their corresponding timestamps, and to save said filtered chapter file into persistent storage on said computer.

15. A system as recited in claim 9 further comprising:
a video player of a browser on a user computer arranged to download said chapter file to said browser along with said video file.

16. A system as recited in claim 9 further comprising:
a fixed document camera arranged to record said video file of a workbook on a local computer; and
said local computer arranged to upload said video file to said computer.

17. A method of creating a chapter file, said method comprising:
inputting a file including audio information into an audio analyzer;
identifying within said file, by comparison to an expected sound, a plurality of discrete sounds, each of said discrete sounds indicating an index into an associated video file;
identifying a timestamp corresponding to each of said discrete sounds that indicates a location of said each index in said associated video file; and
writing each identified index along with its corresponding timestamp into a chapter file in chronological order and saving said chapter file into persistent storage of a computer.

18. A method as recited in claim 17 wherein said file is said video file or said file is an audio file separate from said video file.

19. A method as recited in claim 17 wherein said discrete sounds have the same signal characteristics.

20. A method as recited in claim 17 further comprising:
identifying within said file, by comparison to a plurality of expected sounds which all have different signal characteristics, said plurality of discrete sounds, wherein said each index is based upon said different signal characteristics of said each discrete sound.

21. A method as recited in claim 17 further comprising:
combining said chapter file with said video file in a video player; and
playing said video file on a user computer and displaying contents of said video file along with at least one of said indexes.

22. A method as recited in claim 17 further comprising:
inputting said video file into audio-visual software and splitting said video file into a plurality of still images at a predefined frame rate;
combining said chapter file with said video file and said still images in a video player; and
playing said video file on a user computer and displaying contents of said video file along with at least one of said indexes and at least one of said still images.

23. A method as recited in claim 17 wherein said video file is substantially a video of a workbook having pages, each page corresponding to one of said indexes, and wherein said pages change periodically.

24. A method of creating a chapter file, said method comprising:
inputting a file including spoken words into speech recognition software;
transcribing said spoken words in order to produce a transcript file;
identifying within said transcript file, by comparison to an expected phrase, a plurality of phrases, each of said phrases indicating an index into an associated video file;
identifying a timestamp corresponding to each of said phrases that indicates a location of said each index in said associated video file; and
writing each identified index along with its corresponding timestamp into a chapter file in chronological order and saving said chapter file into persistent storage of a computer.

25. A method as recited in claim 24 wherein said file is said video file or said file is an audio file separate from said video file.

26. A method as recited in claim 24 wherein said phrases are the same.

27. A method as recited in claim 24 further comprising:
identifying within said transcript file, by comparison to a plurality of expected phrases which are all different, said plurality of phrases, wherein said each index is based upon one of said different phrases.

28. A method as recited in claim 24 further comprising:
combining said chapter file with said video file in a video player; and
playing said video file on a user computer and displaying contents of said video file along with at least one of said indexes.

29. A method as recited in claim 24 further comprising:
inputting said video file into audio-visual software and splitting said video file into a plurality of still images at a predefined frame rate;
combining said chapter file with said video file and said still images in a video player; and
playing said video file on a user computer and displaying contents of said video file along with at least one of said indexes and at least one of said still images.

30. A method as recited in claim 24 wherein said video file is substantially a video of a workbook having pages, each page corresponding to one of said indexes, and wherein said pages change periodically.

* * * * *